(12) United States Patent
Xu et al.

(10) Patent No.: US 12,092,135 B2
(45) Date of Patent: Sep. 17, 2024

(54) CONSTANT VALUE METHOD FOR DETECTING AND EVALUATING INTERNAL LEAKAGE OF HYDRAULIC CYLINDER AND DETECTION DEVICE THEREOF

(71) Applicant: ZHEJIANG UNIVERSITY, Zhejiang (CN)

(72) Inventors: Bing Xu, Hangzhou (CN); Xuguang Li, Hangzhou (CN); Junhui Zhang, Hangzhou (CN); Huaizhi Zong, Hangzhou (CN); Xinlei Xu, Hangzhou (CN); Weidi Huang, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 18/408,440

(22) Filed: Jan. 9, 2024

(65) Prior Publication Data

US 2024/0141931 A1   May 2, 2024

Related U.S. Application Data

(63) Continuation of application No. PCT/CN2022/136676, filed on Dec. 5, 2022.

(30) Foreign Application Priority Data

Feb. 4, 2022   (CN) .......................... 202210115151.6

(51) Int. Cl.
   F15B 19/00   (2006.01)
   F15B 13/04   (2006.01)
   G01M 3/32    (2006.01)

(52) U.S. Cl.
   CPC ........ *F15B 19/005* (2013.01); *F15B 13/0401* (2013.01); *G01M 3/3236* (2013.01)

(58) Field of Classification Search
   CPC .. F15B 19/005; F15B 13/0401; G01M 3/3236
   See application file for complete search history.

(56) References Cited

U.S. PATENT DOCUMENTS

2018/0128290 A1   5/2018   Wang et al.
2018/0128292 A1   5/2018   Wang et al.

FOREIGN PATENT DOCUMENTS

CN   201485223 U      5/2010
CN   101776507 A  *  7/2010
                (Continued)

OTHER PUBLICATIONS

CN-101776507-A (Year: 2010).*
(Continued)

*Primary Examiner* — Kristina M Deherrera
*Assistant Examiner* — Fatemeh Esfandiari Nia
(74) *Attorney, Agent, or Firm* — W&G Law Group

(57) ABSTRACT

A constant value method for detecting and evaluating internal leakage in a hydraulic cylinder and a detection device. The method comprises: step (1) measuring an accurate pressure drop value $\Delta p$ of the internal leakage in the hydraulic cylinder; step (2), determining whether the detected hydraulic cylinder meets a standard: if the product of the accurate pressure drop value $\Delta p$ of the internal leakage in the hydraulic cylinder and a corresponding hydraulic stroke L, is less than a standard parameter C for evaluating the internal leakage in the hydraulic cylinder, $$C = \frac{4QtK}{\pi D^2},$$

the internal leakage in me hydraulic cylinder meets the standard. Otherwise, the internal leakage in the hydraulic (Continued)

cylinder does not meet the standard. The detection device comprises a motor, a hydraulic pump, a directional valve, a detected part, a pipeline disassembly joint and a pressure sensor.

8 Claims, 3 Drawing Sheets

(56) References Cited

FOREIGN PATENT DOCUMENTS

| CN | 102588371 | A |   | 7/2012  |          |
|----|-----------|---|---|---------|----------|
| CN | 202789854 | U |   | 3/2013  |          |
| CN | 105298988 | A |   | 2/2016  |          |
| CN | 105526210 | A |   | 4/2016  |          |
| CN | 205780047 | U |   | 12/2016 |          |
| CN | 106870474 | A |   | 6/2017  |          |
| CN | 107727333 | A |   | 2/2018  |          |
| CN | 108316916 | A |   | 7/2018  |          |
| CN | 110552933 | A |   | 12/2019 |          |
| CN | 110608215 | A |   | 12/2019 |          |
| CN | 110657137 | A | * | 1/2020  |          |
| CN | 111271341 | A | * | 6/2020  |          |
| CN | 111692162 | A |   | 9/2020  |          |
| CN | 112049839 | A | * | 12/2020 | F15B 15/17 |
| CN | 112392800 | A |   | 2/2021  |          |
| CN | 114483711 | A |   | 5/2022  |          |

OTHER PUBLICATIONS

CN-110657137-A (Year: 2020).*
CN-111271341-A (Year: 2020).*
CN-112049839-A (Year: 2020).*
International Search Report (PCT/CN2022/136676); Date of Mailing: Feb. 21, 2023.
First Office Action(CN202210115151.6); Date of Mailing: Sep. 19, 2022.

* cited by examiner

CONSTANT VALUE METHOD FOR DETECTING AND EVALUATING INTERNAL LEAKAGE OF HYDRAULIC CYLINDER AND DETECTION DEVICE THEREOF

CROSS-REFERENCE TO RELATED APPLICATIONS

The present application is a continuation of International Application No. PCT/CN2022/136676, filed on Dec. 5, 2022, which claims priority to Chinese Application No. 202210115151.6, filed on Feb. 4, 2022, the contents of both of which are incorporated herein by reference in their entireties.

TECHNICAL FIELD

The present disclosure belongs to the technical field of hydraulic cylinders, and in particular relates to a constant value method for detecting and evaluating internal leakage of a hydraulic cylinder and a detection device thereof.

BACKGROUND

The internal leakage of hydraulic cylinders is classified into external leakage and internal leakage, which is a common fault in hydraulic cylinders. Among them, internal leakage refers to the leakage of oil in a hydraulic cylinder from high-pressure chamber to a low-pressure chamber. It leads to the decrease of an output force of the hydraulic cylinder and seriously affects the performance and efficiency of a hydraulic system. The internal leakage fault has a high occurrence rate and is difficult to detect. When the amount of the internal leakage exceeds a certain standard, the hydraulic cylinder will not work normally.

At present, an internal leakage test in the hydraulic cylinder industry is generally carried out in accordance with the national standard GB/T15622-2005 "Hydraulic Cylinder Test Method" and the industry standard JB/T10205-2010 "Hydraulic Cylinder". The test method is as follows: inputting oil into a working chamber of the hydraulic cylinder to be detected, pressurizing to a nominal pressure, and measuring the amount of internal leakage from unpressurized chamber. According to the investigation, a measuring cup method is widely used in the industry to detect internal leakage in a hydraulic cylinder. The specific operation method is as follows: pressurizing a rodless chamber or a rod chamber to a nominal pressure, and measuring the volume of leaked oil in a certain period of time with a measuring cup at the oil port of an unpressurized chamber.

There are the following problems in the practical application of the national standard and industry standard.

(1) The detection method is inefficient. Taking the internal leakage standard of a double-acting hydraulic cylinder as an example, the internal leakage range of a double-acting hydraulic cylinder (with a cylinder diameter of 40 mm-500 mm) specified in the standard is 0.03 mL/min-4.2 mL/min, and the internal leakage amount is extremely small. Assuming that the internal leakage amount in a hydraulic cylinder is 0.01 mL/min. If there is 5 mL leakage oil is to be detected, the detection time will be more than 8 hours. Therefore, the detection efficiency is extremely low. At the same time, since the hydraulic oil has a certain viscosity, the trace leakage of hydraulic oil tends to adheres to the inner wall of the hydraulic cylinder and the nozzle, which further increases the detection difficulty and cannot meet the requirements of rapid quality detection of batches of products.

(2) The universality of the detection standard is not good. The current standards only stipulate the internal leakage of 19 groups of hydraulic cylinders with a standard size, it can be regarded as "one standard is suitable for one cylinder". However, in practical applications, manufacturers often produce non-standard hydraulic cylinders for users because of special requirements, such as application occasions and installation space. The existing testing standards can hardly cover the testing of non-standard hydraulic cylinders.

To sum up, the existing testing standards for detecting internal leakage of a hydraulic cylinder are inefficient.

SUMMARY

In view of the problems existing in the prior art, the present disclosure provides an efficient, simple and universal constant value method for detecting and evaluating the internal leakage in a hydraulic cylinder and a detection device thereof.

The object of the present disclosure is achieved by the following technical solution:

In an embodiment, a constant value method for detecting and evaluating the internal leakage in a hydraulic cylinder is provided, which includes the following steps:

Step (1), measuring an accurate pressure drop value $\Delta p$ of the internal leakage of the hydraulic cylinder, that is, a pressure drop value of a high-pressure chamber caused by the internal leakage of the hydraulic cylinder.

Step (2), determining whether a detected hydraulic cylinder meets the standard: if the product of the accurate pressure drop value $\Delta p$ of the internal leakage of the hydraulic cylinder and a corresponding hydraulic stroke L, that is $\Delta p \times L$, is less than a standard parameter C for evaluating the internal leakage of the hydraulic cylinder, that is $$C = \frac{4QtK}{\pi D^2},$$

where Q is the standard value of the internal leakage of the hydraulic cylinder, K is the elastic modulus of the oil, t is a test time for measuring the internal leakage of the hydraulic cylinder, L is the stroke of the hydraulic cylinder and D is the inner diameter of the hydraulic cylinder, then the internal leakage of the hydraulic cylinder meets the standard. Otherwise, if $\Delta p \times L \geq C$, the internal leakage of the hydraulic cylinder does not meet the standard.

In an embodiment, the step of measuring an accurate pressure drop value $\Delta p$ of the internal leakage of the hydraulic cylinder includes the following steps:

Step (1.1), measuring the pressure drop of a reference chamber: firstly, supplying oil to the reference chamber. When the pressure reaches a rated test pressure, allowing the reference chamber to be in a pressure-maintaining state, at which time the pressure of the reference chamber is p1-1. Then maintaining the pressure for a predetermined time, at which time the pressure of the reference chamber is p2-1. The difference between p1-1 and p2-1 is the pressure drop $\Delta p\_1$ of the reference chamber.

Step (1.2), measuring a pressure drop of the hydraulic cylinder: firstly, disassembling the reference chamber in step (1.1) by a pipeline disassembly joint, and installing the hydraulic cylinder on the same hydraulic test bench. Then supplying oil to the high-pressure chamber of the hydraulic cylinder, and driving the piston rod of the hydraulic cylinder to extend to the end of stroke. When the pressure of the hydraulic cylinder reaches the rated test pressure, allowing the hydraulic cylinder to be in a pressure-maintaining state, at which time the pressure of the high-pressure chamber of the hydraulic cylinder is p1-2. Then maintaining the pressure for the predetermined time, which is the same as the reference chamber in step (1.1), at which time the pressure of the high-pressure chamber of the hydraulic cylinder is p2-2. The difference between p1-2 and p2-2 is the pressure drop $\Delta p\_2$ of the high-pressure chamber of the hydraulic cylinder.

Step (1.3), calculating the accurate pressure drop value $\Delta p$ of the internal leakage in the hydraulic cylinder: the accurate pressure drop value of the internal leakage in the hydraulic cylinder is $\Delta p = \Delta p\_2 - \Delta p\_1$.

In an embodiment, before the pressure maintaining test of the reference chamber starts in step (1.1), motor is started to drive a hydraulic pump to work, and directional valve is started for a trial operation to eliminate residual air in the hydraulic test bench.

In an embodiment, in step (1.1), the second stop valve of an oil return circuit is closed, the directional valve is adjusted to work in the left position, the hydraulic pump supplies oil to the reference chamber by the directional valve, and the pressure of the reference chamber is detected by a pressure sensor. When the pressure reaches the rated test pressure, that is, a nominal pressure of the hydraulic cylinder, the directional valve is adjusted to work in a middle position to lock the reference chamber, the reference chamber is in a pressure-maintaining state. And at the same time, a first stop valve is closed to lock a standard chamber, the pressure of the standard chamber is the same as that in the reference chamber, that is, p1-1. The pressure is maintained for a predetermined time, at which time the pressure of the reference chamber drops to p2-1. The difference between the pressure p1-1 of the standard chamber and the pressure p2-1 of the reference chamber is directly measured by a differential pressure sensor, which is the pressure drop $\Delta p\_1$ of the reference chamber.

In an embodiment, in step (1.2), the motor is started to drive the hydraulic pump to work. After the trial operation to eliminate residual air in the hydraulic cylinder, the directional valve is adjusted to work in the left position. The hydraulic pump supplies oil to the high-pressure chamber of the hydraulic cylinder by the directional valve, drives the piston rod of the hydraulic cylinder to extend to the end of the stroke, and measures the pressure of the high-pressure chamber of the hydraulic cylinder by the pressure sensor. When the pressure reaches the rated test pressure, that is, the nominal pressure of the hydraulic cylinder, the directional valve is adjusted to work in a middle position to lock the hydraulic cylinder. The hydraulic cylinder is in a pressure-maintaining state, and at the same time, the first stop valve is closed to lock the standard chamber. At which time the pressure of the standard chamber is the same as the high-pressure chamber pressure of the hydraulic cylinder, that is, p1-2. The pressure is maintained for a predetermined time, at which time the pressure of the high-pressure chamber of the hydraulic cylinder drops top2-2. The difference between the pressure p1-2 of the standard chamber and the pressure p2-2 of the high-pressure chamber of the hydraulic cylinder is directly detected by the differential pressure sensor, which is the pressure drop $\Delta p\_2$ of the high-pressure chamber of the hydraulic cylinder.

In an embodiment, a detection device is provided for the constant value method for detecting and evaluating internal leakage in a hydraulic cylinder, including:
a motor;
a hydraulic pump coaxially connected with the motor;
a directional valve, and the oil inlet port is communicated with an oil outlet port of the hydraulic pump;
a detected part including a chamber with an oil inlet port and an oil outlet port. It is communicated with the directional valve by an oil inlet line 13 and an oil outlet line 14 which forms an oil circuit;
a pipeline disassembly joint detachably connected to the oil inlet port, the oil outlet port of the detected part; and
a pressure sensor mounted on the oil inlet line 13 and the oil outlet line 14. It is configured to measure a pressure in the detected part.

In an embodiment, the oil inlet line 13 and the oil outlet line 14 are connected with a standard chamber, a first stop valve and a differential pressure sensor, which are respectively mounted between the standard chamber and the detected part.

In an embodiment, the detected part is a hydraulic cylinder or a reference chamber.

In an embodiment, the oil inlet line 13 and the oil outlet line 14 are connected with a second stop valve mounted between the reference chamber and the pipeline disassembly joint.

The constant value method and device for detecting and evaluating the internal leakage in a hydraulic cylinder in the embodiment of the present disclosure have at least the following beneficial effects:

i) Compared with that traditional method for detecting the trace leakage by measuring cylinder, the pressure signal is simple, easy to measure. It is of high precision and more sensitive to leakage, so that the pressure drop caused by internal leakage of the hydraulic cylinder can be accurately obtained in a short time. The measurement efficiency is high, and the test time is greatly shortened;

ii) Only by comparing the product of the detected pressure drop value and the stroke of the hydraulic cylinder with the constant value C, it can be directly judged whether the internal leakage meets the standard, which omits complicated conversion and tedious table lookup. It is simple, intuitive and easy to use;

iii) The detection method is suitable for various types of hydraulic cylinders. It can meet the detection requirements of non-standard hydraulic cylinders. Thus it has strong universality;

iv) A standard chamber is provided, and the pressure difference between the standard chamber and the high-pressure chamber (the reference chamber) of the detected hydraulic cylinder is directly detected by the differential pressure sensor, which shortens the measuring range of the pressure sensor and improves the measurement accuracy of the pressure drop signal. At the same time, the pressures of the standard chamber and the high-pressure chamber (the reference chamber) of the hydraulic cylinder are simultaneously maintained, which further eliminates the influence of environmental temperature change on the pressure drop value;

v) A reference chamber is provided to eliminate the influence of leakage at the connection of the hydraulic system pipeline, the directional valve and the pressure test joint. It improves the accuracy of internal leakage detection. The test bench has a simple structure and low cost.

DESCRIPTION OF EMBODIMENTS

The present disclosure will be further described in detail with reference to the drawings and specific embodiments.

Figure 1:
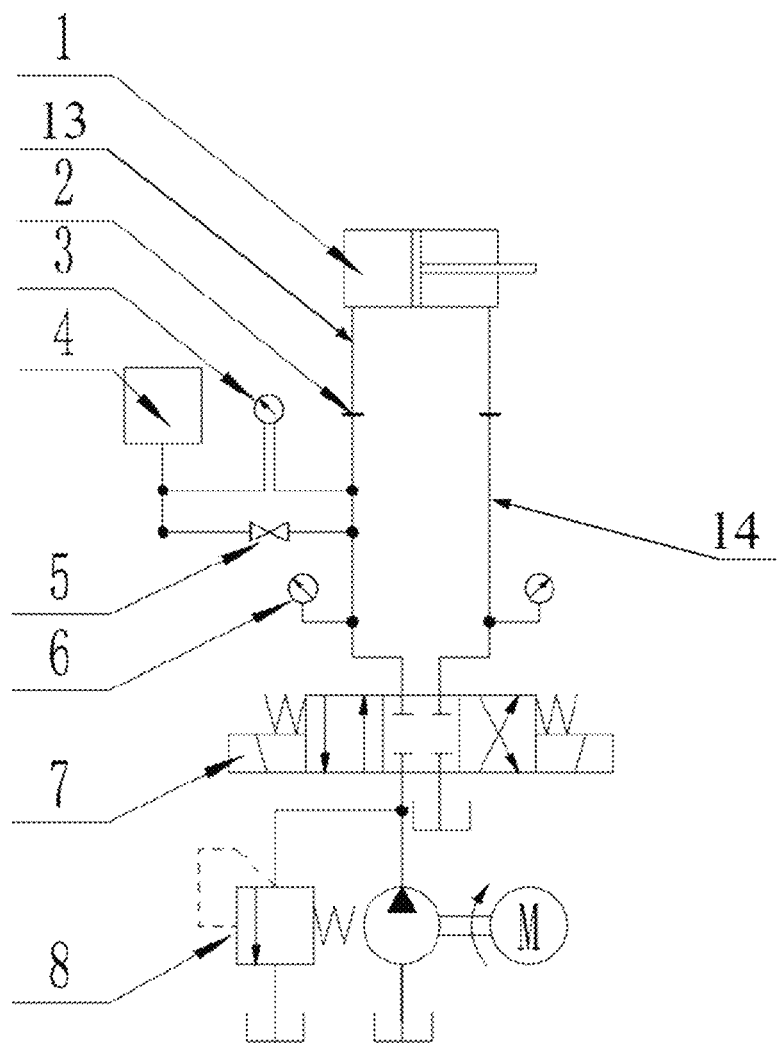
FIG. 1 is a schematic structural diagram of a device for detecting and evaluating internal leakage in a hydraulic cylinder as a test group according to an embodiment of the present disclosure.

As shown in FIG. 1, in one embodiment, a constant value method detection device suitable for detecting and evaluating the internal leakage in a hydraulic cylinder is provided, which includes a motor 10, a hydraulic pump 9, a directional valve 7, a detected part, a pressure sensor 6 and a pipeline disassembly connector 2.

The hydraulic pump 9 is coaxially connected with the motor 10, and is driven by the motor 10. It provides power oil for the detected hydraulic cylinder 1 in test projects, such as the trial operation according to the national standards.

Figure 2:
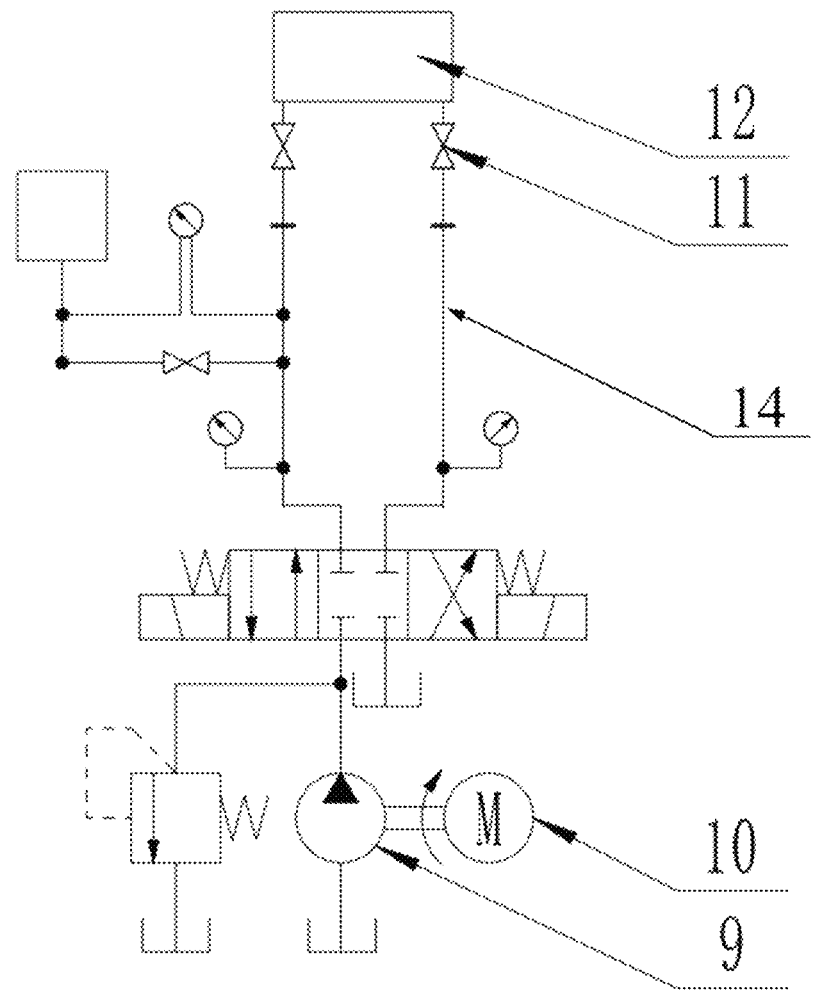
FIG. 2 is a schematic structural diagram of a device for detecting and evaluating internal leakage in a hydraulic cylinder as the reference group according to an embodiment of the present disclosure.

An oil inlet port of the directional valve 7 is communicated with an oil outlet port of the hydraulic pump 9. The directional valve 7 can be a three-position four-way directional valve 7. The detected part has a chamber with an oil inlet port and an oil outlet port. It is communicated with the directional valve 7 by an oil inlet line 13 and an oil outlet line 14 to form an oil circuit together. As shown in FIG. 1, in one embodiment, the detected part is a hydraulic cylinder 1 or a reference chamber 12. When a hydraulic cylinder 1 is use as the detected part, the device for detecting and evaluating the internal leakage in the hydraulic cylinder 1 is used as a test group. When the three-position four-way directional valve 7 works in the left position, the piston rod of the detected hydraulic cylinder 1 extends. When the three-position four-way directional valve 7 works in the right position, the piston rod of the detected hydraulic cylinder 1 retracts. When the three-position four-way directional valve 7 works in the middle position, the detected hydraulic cylinder 1 is bidirectionally locked, and the piston of the detected hydraulic cylinder 1 stops reliably. As shown in FIG. 2, when the detected part adopts a reference chamber 12, the device for detecting and evaluating internal leakage in the hydraulic cylinder 1 serves as a reference group.

A pressure sensor 6 is mounted on the oil inlet line 13 and the oil outlet line 14 and used for measuring the pressure in the detected part, that is, the pressure sensor 6 is used for measuring the pressure of the high-pressure chamber of the detected hydraulic cylinder 1 and the pressure of the reference chamber 12.

The pipeline disassembly joint 2 is detachably connected to the oil inlet port and oil outlet port of the detected part.

As shown in FIG. 1 and FIG. 2, in one embodiment, in the reference group and the test group, the oil inlet line 13 and the oil outlet line 14 are connected with a standard container 4. A first stop valve 5 and a differential pressure sensor 3 that are respectively located between the standard container 4 and the detected part. A relief valve 8 located between the directional valve 7 and the hydraulic pump 9 is connected to the oil inlet line 13 and the oil outlet line 14.

The standard chamber 4 is similar to the hydraulic cylinder 1 in structure herein. But there is no structure such as piston or piston rod, and there is no internal leakage at all.

The first stop valve 5 plays a role of completely blocking the oil line without oil leakage.

The differential pressure sensor 3 measures the pressure difference between the high-pressure chamber of the detected hydraulic cylinder 1 and the standard chamber 4. The pressure difference is precisely the pressure drop value of the high-pressure chamber of the detected hydraulic cylinder 1. Compared with the way of directly recording the pressure of the high-pressure chamber of the detected hydraulic cylinder 1, the measuring range of the pressure sensor 6 is greatly reduced, and the accuracy of the measurement of internal leakage is improved. At the same time, during the test, the pressure of the standard chamber 4 and that of the high-pressure chamber of the detected hydraulic cylinder 1 are maintained simultaneously, which further eliminates the influence of environmental temperature change on the pressure drop value.

As shown in FIG. 2, in one embodiment, in the reference group, the oil outlet line 14 is connected with a second stop valve 11 located between the reference chamber 12 and the pipeline disassembly joint 2. The second stop valve 11 plays a role of completely blocking the oil line without oil leakage.

The reference chamber 12 is used as a reference group of the detected hydraulic cylinder 1 for test. In order to accurately measure the pressure drop caused by the internal leakage of the hydraulic cylinder 1, before the internal leakage detection and evaluation test of the hydraulic cylinder 1, it is necessary to carry out a pressure maintaining test on the reference chamber 12 to simulate a test situation where the hydraulic cylinder 1 has no internal leakage at all. It can eliminate any influence of the internal leakage at the connection of the hydraulic test bench pipeline, the directional valve 7 and the pressure test joint. The reference chamber 12 is similar in structure to the hydraulic cylinder 1, but there is no structure such as piston and piston rod, and there is no internal leakage at all. The difference between the pressure drop of the detected hydraulic cylinder 1 and the reference chamber 12 is precisely the pressure drop caused by the internal leakage of the detected hydraulic cylinder 1.

In an embodiment, a constant value method for detecting and evaluating internal leakage in a hydraulic cylinder is provided, which includes the following steps:

In step (1), an accurate pressure drop value $\Delta p$ of the internal leakage of the hydraulic cylinder, that is, a pressure drop value of a high-pressure chamber caused by the internal leakage of the hydraulic cylinder, is measured.

In step (2), whether a detected hydraulic cylinder meets a standard is judged: if a product of the accurate pressure drop value $\Delta p$ of the internal leakage of the hydraulic cylinder and a corresponding hydraulic stroke L, namely $\Delta p \times L$, is less than a standard parameter C for evaluating the internal leakage of the hydraulic cylinder, that is $\Delta p \times L < C$, wherein $$C = \frac{4QtK}{\pi D^2},$$

then the internal leakage of the hydraulic cylinder meets the standard. Otherwise, the internal leakage of the hydraulic cylinder does not meet the standard.

The constant value method for detecting and evaluating the internal leakage in the hydraulic cylinder 1 are derived as follows:

A rodless chamber of the detected hydraulic cylinder has a filling volume of $V_1$ and a pressure of $p_1$, and the leakage amount after a time t is $V_L$. At this time, the pressure of the rodless chamber of the detected hydraulic cylinder 1 is $p_2$, and the corresponding oil volume is $V_2$. Therefore the oil volume of the internal leakage in the detected hydraulic cylinder 1 is $V_L = V_1 - V_2$ and the internal leakage amount is recorded as $Q_L$. According to the elastic modulus of oil K=Vdp/dV, the following can be obtained:

$$K = \frac{V_1(p_1 - p_2)}{V_1 - V_2} = \frac{V_1(p_1 - p_2)}{V_L};$$

$$Q_L = \frac{V_L}{t} = \frac{V_1(p_1 - p_2)}{tK};$$

The interference of internal leakage of other components of the hydraulic system is eliminated by carrying out a pressure maintaining test on the sealed chamber. The hydraulic cylinder 1 is allowed to have a pressure drop value of $\Delta p_1$ after pressure maintaining for a certain period of time. Compared with the pressure drop value of $\Delta p_2$ in the chamber 12, the pressure drop value $\Delta p$ caused by internal leakage in the hydraulic cylinder 1 is:

$$\Delta p = \Delta p_1 - \Delta p_2;$$

According to the calculation formula of the internal leakage flow:

$$Q = \frac{\Delta p V}{Kt} = \frac{(\Delta p_1 - \Delta p_2)\pi D^2 L}{4Kt};$$

The formula is transformed to get:

$$C = (\Delta p_1 - \Delta p_2) \cdot L = \frac{4QtK}{\pi D^2};$$

where Q is a standard value of the internal leakage in the hydraulic cylinder 1, and is selected based on the model of the hydraulic cylinder 1 according to the industry standard JB/T10205-2010 "Hydraulic Cylinder 1". K is an elastic modulus of oil, which is generally K=1.4–2.0 GPa for pure oil, and 0.7–1.4 GPa for oil mixed with air. The test time for internal leakage measurement in the hydraulic cylinder 1 is adjusted according to the size of the 20 hydraulic cylinder 1. L is the stroke of the hydraulic cylinder 1. D is the inner diameter of the hydraulic cylinder 1, the value of which is taken according to the specific model of the hydraulic cylinder 1.

It can be concluded from calculation that the product of the pressure drop $\Delta p \Delta p = \Delta p_1 - \Delta p_2$ caused by internal leakage of the hydraulic cylinder 1 and the stroke L of the hydraulic cylinder 1 is approximately a constant value C.

Based on the above discussion, this embodiment proposes a constant value method for detecting and evaluating internal leakage in the hydraulic cylinder 1. The constant value C is set as a standard parameter for evaluating the internal leakage in the hydraulic cylinder 1, in which the elastic modulus K of the oil used for the constant value C is selected according to the oil quality and test environment, and the measurement time t is appropriately adjusted according to the size and model of the hydraulic cylinder 1.

For example, let K=1.5 GPa, t=60 min, the standard table for the internal leakage amount of a double-acting hydraulic cylinder 1 in national standard GB/T15622-2005 "Test Method for Hydraulic Cylinder 1" and industry standard JB/T10205-2010 "Hydraulic Cylinder 1" is converted. At this time, the constant value C may be set as 2000 MPa·mm. If the product of the pressure drop caused by the internal leakage of the hydraulic cylinder 1 and the corresponding hydraulic stroke obtained in the control experiment is less than 2000 MPa·mm, the internal leakage of the hydraulic cylinder 1 meets the standard. Otherwise, it does not meet the standard.

TABLE 1

Constant value C when K = 1.5 GPa, t = 60 min

| Internal diameter of hydraulic cylinder 1 (mm) | Internal leakage flow (mL/min) | Measuring time (min) | Elastic modulus (GPa) | Pressure drop * stroke (C) (MPa*mm) |
|---|---|---|---|---|
| 40.00 | 0.03 | 60.00 | 1.50 | 2148.59 |
| 50.00 | 0.05 | 60.00 | 1.50 | 2291.83 |
| 63.00 | 0.08 | 60.00 | 1.50 | 2309.73 |
| 80.00 | 0.13 | 60.00 | 1.50 | 2327.64 |
| 90.00 | 0.15 | 60.00 | 1.50 | 2122.07 |
| 100.00 | 0.20 | 60.00 | 1.50 | 2291.83 |
| 110.00 | 0.22 | 60.00 | 1.50 | 2083.48 |
| 125.00 | 0.28 | 60.00 | 1.50 | 2053.48 |
| 140.00 | 0.30 | 60.00 | 1.50 | 1753.95 |
| 160.00 | 0.50 | 60.00 | 1.50 | 2238.12 |
| 180.00 | 0.63 | 60.00 | 1.50 | 2228.17 |
| 200.00 | 0.70 | 60.00 | 1.50 | 2005.35 |
| 220.00 | 1.00 | 60.00 | 1.50 | 2367.59 |
| 250.00 | 1.10 | 60.00 | 1.50 | 2016.81 |
| 280.00 | 1.40 | 60.00 | 1.50 | 2046.28 |
| 320.00 | 1.80 | 60.00 | 1.50 | 2014.30 |
| 360.00 | 2.36 | 60.00 | 1.50 | 2086.70 |
| 400.00 | 2.80 | 60.00 | 1.50 | 2005.35 |
| 500.00 | 4.20 | 60.00 | 1.50 | 1925.14 |

Figure 3:
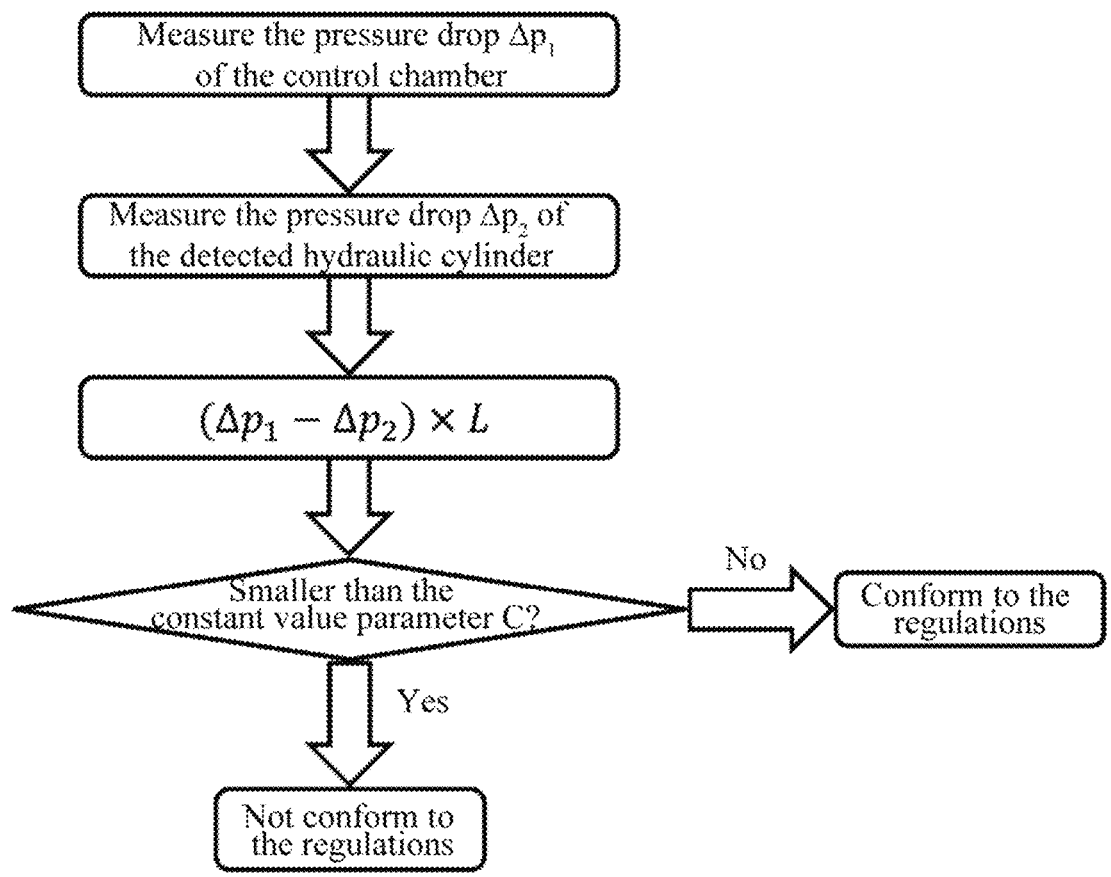
FIG. 3 is a flow chart of the constant value method for detecting and evaluating internal leakage in a hydraulic cylinder according to an embodiment of the present disclosure.

As shown in FIG. 3, in an embodiment, the measurement of the accurate pressure drop value $\Delta p$ for the internal leakage in the hydraulic cylinder 1 includes the following steps:

In step (1.1), the pressure drop of the reference chamber 12 is measured: firstly, oil is supplied to the reference chamber 12. When the pressure reaches a rated test pressure, the reference chamber 12 is allowed to be in a pressure-maintaining state, at which time the pressure of the reference chamber 12 is p1-1. The pressure is maintained for a predetermined time, at which time the pressure of the reference chamber 12 is p2-1. The difference between p1-1 and p2-1 is the pressure drop $\Delta p\_1$ of the reference chamber 12.

In step (1.2), a pressure drop of the hydraulic cylinder 1 is measured: firstly, the reference chamber 12 in step (1.1) is disassembled by a pipeline disassembly joint 2, and the hydraulic cylinder 1 is installed on the same hydraulic test bench. Then oil is supplied to the high-pressure chamber of the hydraulic cylinder 1, and the hydraulic cylinder 1 is driven to extend to an end of a stroke. When the pressure of the hydraulic cylinder 1 reaches the rated test pressure, the hydraulic cylinder 1 is allowed to be in a pressure-maintaining state, at which time the pressure of the high-pressure chamber of the hydraulic cylinder 1 is p1-2. The pressure is maintained for the predetermined time, which is the same as the reference chamber in step (1.1), at which time the pressure of the high-pressure chamber of the hydraulic cylinder 1 is p2-2. The difference between p1-2 and p2-2 is the pressure drop $\Delta p\_2$ of the high-pressure chamber of the hydraulic cylinder 1.

In step (1.3), the accurate pressure drop value $\Delta p$ of the internal leakage in the hydraulic cylinder 1 is calculated: the accurate pressure drop value of the internal leakage in the hydraulic cylinder $\Delta p=\Delta p\_2-\Delta p\_1$.

In an embodiment, before the pressure maintaining test on the reference chamber 12 in step (1.1) starts, the motor 10 is started to drive the hydraulic pump 9 to work, and the directional valve 7 is operated to eliminate the residual air in the hydraulic test bench.

In one embodiment, the following operation is adopted in step (1.1): the pressure maintaining test is started.

The second stop valve 11 of an oil return circuit is closed, the directional valve 7 is adjusted to work in a left position. The hydraulic pump 9 supplies oil to the reference chamber 12 by the directional valve, and a pressure of the reference chamber is detected by a pressure sensor 6. When the pressure reaches a rated test pressure (a nominal pressure of the hydraulic cylinder), the directional valve 7 works in a middle position to reliably lock the reference chamber 12. The reference chamber 12 is in a pressure-maintaining state, and a first stop valve 5 is closed to reliably lock a standard chamber 4, at which time a pressure of the standard chamber 4 is the same as that in the reference chamber 12, that is, p1-1. The pressure is maintained for a predetermined time t, at which time the pressure of the reference chamber 12 drops to p2-1. And the difference between the pressure p1-1 of the standard chamber and the pressure p2-1 of the reference chamber is directly measured by a differential pressure sensor 3, which is the pressure drop $\Delta p\_1$ of the reference chamber. The pressure drop value obtained from the pressure maintaining test is all caused by the leakage of the pipeline, directional valve and pressure test joint of the hydraulic test bench.

Further, the following operation is adopted in step (1.2): the motor 10 is started to drive the hydraulic pump 9 to work. After to eliminating the residual air in the detected hydraulic cylinder 1 through the trial operation, the directional valve 7 is adjusted to work in the left position. The hydraulic pump 9 supplies oil to the high-pressure chamber of the detected hydraulic cylinder 1 by the directional valve 7, driving the detected hydraulic cylinder 1 to extend to the end of the stroke. Then the pressure of the high-pressure chamber of the detected hydraulic cylinder is measured by the pressure sensor 6. When the pressure reaches a rated test pressure (a nominal pressure of the hydraulic cylinder) and stays stable, the directional valve 7 is adjusted to work in a middle position to reliably lock the hydraulic cylinder 1, the detected hydraulic cylinder 1 is in a pressure-maintaining state. At the same time, a first stop valve 5 is closed to reliably lock the standard chamber, at which time the pressure of the standard chamber 4 is the same as the high-pressure chamber pressure of the hydraulic cylinder 1, that is, p1-2. The pressure is maintained for a predetermined time, at which time the pressure of the high-pressure chamber of the hydraulic cylinder drops to p2-2. The difference between the pressure p1-2 of the standard chamber and the pressure p2-2 of the high-pressure chamber of the hydraulic cylinder 1 is directly detected by the differential pressure sensor 3, which is the pressure drop $\Delta p\_2$ of the high-pressure chamber of the hydraulic cylinder 1.

The difference between the pressure drop value $\Delta p\_2$ of the hydraulic cylinder detected in the test and the pressure drop value $\Delta p\_1$ caused by the internal leakage of the pipeline, the directional valve and the pressure test joint of the hydraulic test bench is the accurate pressure drop value $\Delta p$ of the internal leakage of the detected hydraulic cylinder, that is, $\Delta p=\Delta p\_2-\Delta p\_1$.

The constant value method and the device for detecting and evaluating the internal leakage in a hydraulic cylinder in the embodiment of the present disclosure have at least the following beneficial effects:

i) Compared with that traditional method for detecting the trace leakage flow by use a measuring cylinder, the pressure signal is simple, easy to measure. It is of high precision and more sensitive to leakage when using constant value method. So that the pressure drop caused by internal leakage of the hydraulic cylinder can be accurately obtained in a short time. The measurement efficiency is high, and the test time is greatly shortened;

ii) Only by comparing the product of the detected pressure drop value and the stroke of the hydraulic cylinder with the constant value C. It can be directly judged whether the internal leakage meets a certain standard, which omits complicated conversion and tedious table lookup. It is simple, intuitive and easy to use;

iii) The detection method is suitable for various types of hydraulic cylinders. It can meet the detection requirements of non-standard hydraulic cylinders, and thus has strong universality;

iv) A standard chamber is provided, and the pressure difference between the standard chamber and the high-pressure chamber (the reference chamber) of the detected hydraulic cylinder is directly detected by the differential pressure sensor. It shortens the measuring range of the pressure sensor and improves the measurement accuracy of the pressure drop signal. At the same time, the pressures of the standard chamber and the high-pressure chamber (the reference chamber) of the hydraulic cylinder under test are simultaneously maintained, which further eliminates the influence of environmental temperature change on the pressure drop value;

v) A reference chamber is provided to eliminate the influence of leakage at the connection of the hydraulic system pipeline. The directional valve and the pressure test joint, which improves the accuracy of internal leakage detection, and the test bench has a simple structure and a low cost.

The embodiments of the present disclosure have been described in detail above with reference to the attached drawings, but the present disclosure is not limited to the above embodiments. Various changes can be made within the range of knowledge of those skilled in the art without departing from the purpose of the present disclosure. In addition, embodiments of the present disclosure and features in the embodiments can be combined with each other without conflict.

What are claimed:

1. A constant value method for detecting and evaluating an internal leakage in a hydraulic cylinder, comprising:
   step (1), measuring a pressure drop value $\Delta p$ of the internal leakage of the hydraulic cylinder $\Delta p$ represents a pressure drop value of a high-pressure chamber caused by the internal leakage of the hydraulic cylinder, comprising:

step (1.1), measuring a first pressure drop Δp-1 of a reference chamber, comprising:
supplying oil to the reference chamber;
when a pressure of the reference chamber reaches a rated test pressure, allowing the reference chamber to be in a pressure-maintaining state of the reference chamber, wherein a first pressure of the reference chamber is p1-1 at this moment, and wherein after maintaining the pressure of the reference chamber for a predetermined time, a second pressure of the reference chamber is p2-1; and
obtaining a difference between p1-1 and p2-1 as the pressure drop Δp-1 of the reference chamber;
step (1.2), measuring a pressure drop Δp-2 of the hydraulic cylinder, comprising:
disassembling the reference chamber in the step (1.1) by a pipeline disassembly joint, and assembling the hydraulic cylinder on a same hydraulic test bench;
supplying oil to the high-pressure chamber of the hydraulic cylinder, and driving the hydraulic cylinder to extend to an end of a stroke;
when a pressure of the hydraulic cylinder reaches the rated test pressure, allowing the hydraulic cylinder to be in a pressure-maintaining state of the hydraulic cylinder, wherein a first pressure of the high-pressure chamber of the hydraulic cylinder is p1-2 at this moment, and wherein after maintaining the pressure of the high-pressure chamber of the hydraulic cylinder for the predetermined time, a second pressure of the high-pressure chamber of the hydraulic cylinder is p2-2; and
obtaining a difference between p1-2 and p2-2 as a second pressure drop Δp-2 of the hydraulic cylinder; and
step (1.3), calculating an accurate pressure drop value Δp of the internal leakage in the hydraulic cylinder: the accurate pressure drop value Δp of the internal leakage in the hydraulic cylinder is Δp=Δp-2-Δp-1;
step (2), determining whether the hydraulic cylinder satisfies a standard:
when a product of the pressure drop value Δp of the internal leakage of the hydraulic cylinder and a hydraulic stroke L corresponding to the pressure drop value Δp, namely Δp×L, is less than a standard parameter C for evaluating the internal leakage of the hydraulic cylinder, that is, Δp×L<C, wherein, $$C = \frac{4QtK}{\pi D^2},$$

where Q is a standard value of the internal leakage of the hydraulic cylinder defined as $$Q = \frac{(\Delta p_1 - \Delta p_2)\pi D^2 L}{4Kt},$$

wherein K is an elastic modulus of an oil in the cylinder, t is a test time for measuring the internal leakage of the hydraulic cylinder, L is the stroke of the hydraulic cylinder and D is an inner diameter of the hydraulic cylinder, the internal leakage of the hydraulic cylinder satisfies the standard; and
when Δp×L≥C, the internal leakage of the hydraulic cylinder does not satisfy the standard.

2. The constant value method for detecting and evaluating internal leakage in the hydraulic cylinder according to claim 1, wherein prior to allowing the reference chamber to be in the pressure-maintaining state of the reference chamber, the step (1.1) further comprises: starting a motor to drive a hydraulic pump to work, and operating a directional valve for trial operation to eliminate residual air in the hydraulic test bench.

3. The constant value method for detecting and evaluating internal leakage in the hydraulic cylinder according to claim 2, wherein in the step (1.1), a second stop valve of an oil return circuit is closed, the directional valve works in a left position, the hydraulic pump supplies oil to the reference chamber by the directional valve, and a pressure of the reference chamber is detected by a pressure sensor, wherein when the pressure of the reference chamber reaches the rated test pressure, namely a nominal pressure of the hydraulic cylinder, the directional valve works in a middle position to lock the reference chamber, and allow the reference chamber to be in the pressure-maintaining state of the reference chamber, a first stop valve is closed to lock a standard chamber, and a pressure of the standard chamber is the same as the first pressure of the reference chamber, namely p1-1, wherein after the pressure of the standard chamber is maintained for a predetermined time, the second pressure of the reference chamber drops to p2-1, the difference between the pressure p1-1 of the standard chamber and the pressure p2-1 of the reference chamber is directly measured by a differential pressure sensor, as the pressure drop Δp-1 of the reference chamber.

4. The constant value method for detecting and evaluating internal leakage in the hydraulic cylinder according to claim 3, wherein in the step (1.2), the motor is started to drive the hydraulic pump to work, and after a trial operation to eliminate residual air in the hydraulic cylinder, the directional valve is operated to work in the left position, the hydraulic pump supplies oil to the high-pressure chamber of the hydraulic cylinder by the directional valve, the oil drives a piston of the hydraulic cylinder to extend to the end of the stroke, the pressure of the high-pressure chamber of the hydraulic cylinder is measured by the pressure sensor, wherein when the pressure of the high-pressure chamber of the hydraulic cylinder reaches the rated test pressure, namely the nominal pressure of the hydraulic cylinder, the directional valve works in a middle position to lock the hydraulic cylinder and allow the hydraulic cylinder to be in the pressure-maintaining state of the hydraulic cylinder, the first stop valve is closed to lock the standard chamber, and the pressure of the standard chamber is equal to the pressure of the high-pressure chamber of the hydraulic cylinder, namely p1-2, wherein after the pressure is maintained for a predetermined time, the second pressure of the high-pressure chamber of the hydraulic cylinder drops to p2-2, the difference between the first pressure p1-2 of the standard chamber and the second pressure p2-2 of the high-pressure chamber of the hydraulic cylinder is directly detected by the differential pressure sensor as the second pressure drop Δp-2 of the high-pressure chamber of the hydraulic cylinder.

5. A detection device for the constant value method for detecting and evaluating internal leakage in the hydraulic cylinder according to claim 1, including:
a motor;
a hydraulic pump coaxially connected with the motor;
a directional valve, an oil inlet port of the directional valve which is communicated with an oil outlet port of the hydraulic pump;

a detected part provided with a chamber with an oil inlet port and an oil outlet port, and communicated with the directional valve by an oil inlet line and an oil outlet line to form an oil circuit;

a pipeline disassembly joint detachably connected to the oil inlet port and the oil outlet port of the detected part; and a first pressure sensor mounted on an oil inlet line configured to measure a first pressure in the detected part and a second pressure sensor mounted on an oil outlet line configured to measure a second pressure in the detected part.

6. The detection device according to claim 5, wherein the oil outlet line is connected to a standard chamber, a first stop valve and a differential pressure sensor, wherein the first stop valve and the differential pressure sensor are both provided between the standard chamber and the detected part.

7. The detection device according to claim 5, wherein the detected part is the hydraulic cylinder or the reference chamber.

8. The detection device according to claim 7, further comprising a second stop valve located on the oil inlet line, and a third stop valve located on the oil outlet line.

* * * * *